United States Patent [19]

Carey, II et al.

[11] Patent Number: 5,296,300

[45] Date of Patent: Mar. 22, 1994

[54] METHOD TREATING TERNE STEEL

[75] Inventors: Jay F. Carey, II, Follansbee, W. Va.; Mehrooz Zamanzadeh, Pittsburgh, Pa.

[73] Assignee: The Louis Berkman Company, Steubenville, Ohio

[21] Appl. No.: 728,108

[22] Filed: Jul. 10, 1991

[51] Int. Cl.$^5$ .................... B32B 15/04; B32B 11/00
[52] U.S. Cl. .................... 428/457; 428/46; 428/336; 428/468; 428/469; 428/489; 428/644; 428/645; 428/646; 428/648
[58] Field of Search ............ 428/46, 336, 457, 468, 428/469, 489, 644, 645, 646, 648

[56] References Cited

U.S. PATENT DOCUMENTS

| | | | |
|---|---|---|---|
| 2,748,043 | 7/1953 | Mullen | 428/468 |
| 3,050,484 | 8/1962 | Wood et al. | 428/468 |
| 4,595,636 | 6/1986 | Wiercinski et al. | 428/489 |
| 4,600,635 | 7/1980 | Wiercinski et al. | 428/220 |

*Primary Examiner*—Paul J. Thibodeau
*Assistant Examiner*—Leszek Kiliman
*Attorney, Agent, or Firm*—Body, Vickers & Daniels

[57] ABSTRACT

A method of treating a terne coating to accelerate the patina on the terne coating. The terne coated metal is coated with a specially formulated asphalt based paint which produces a semi-transparent or translucent, dull finish on the terne coated metal. The coated terne coated metal is then exposed to the natural atmospheric elements for at least six months wherein such time enhanced oxidation of lead and tin occurs.

13 Claims, 1 Drawing Sheet

METHOD TREATING TERNE STEEL

The present invention relates to the terne coated sheet material and more particularly to a method of treating terne coated steel strips with an asphalt based paint to accelerate the patina formation on the terne coating. Terne coated metal normally take over ten years to form a lead and tin oxide film, commonly known as weathering. When the terne coated sheet metal is properly treated with a special asphalt based paint containing a suspension of free carbon and a thinner and then exposed to the natural elements of the atmosphere, the period of weathering the terne coated metal dramatically reduces from approximately ten years to approximately six months. The treatment involves use of a specially thin film of the asphalt based paint whereby ultraviolet light weathers the terne coating. The thin layer or coating of paint is permeable to the weather. In accordance with the invention, the treated terne metal and method of treating the terne metal involves the application of an asphalt based paint to produce a semi-transparent or translucent coating and exposing the coated product to oxygen, moisture and to the sun's radiation from the sun.

BACKGROUND OF THE INVENTION

For many years, materials have been treated for various purposes such as fireproofing, rust inhibiting and priming. Many of the treatment methods that utilized asphalt based products involve the inhibition of oxidation of the treated metal. One such use of petroleum based paint product used to inhibit corrosion is disclosed in Troutman U.S. Pat. No. 4,406,704. Troutman discloses an air dryable corrosion inhibiting primer which limits the amount of volatile organic compounds that are emitted into the atmosphere by reducing the solvent content. This relatively environmentally friendly primer consists of an air dryable synthetic alkyd resin, an organic solvent, a suspending agent, polar additives, a wetting agent, coloring pigments, a dryer, an extender pigment and a corrosion inhibitor such as calcium borosilicate.

Another type of corrosion resisting composition containing asphalt is claimed in Miller U.S. Pat. No. 3,549,391. Miller discloses corrosion proofing composition which can be used for rust proofing undersides of cars. The rustproofing asphalt based sprayable coating consists of asphalt, mineral fillers, a metal soap of a waxy hydrocarbon oxidate and an organophilic modified clay.

Cogliano U.S. Pat. No. 4,503,106 discloses a sheet-like barrier which can be used for insulation and waterproofing purposes. The construction board barrier consists of an adhesive bituminous material and may contain a layer of asphalt.

Another well known anti-corrosion metal treatment method is the coating of a metal with a terne alloy. Terne is a term used to describe an alloy containing about 10% tin and 90% lead. The terne plate is conventionally applied to a ferrous metal by immersing the ferrous metal in a molten bath of terne metal. The terne coating is primarily used to reduce the formation of ferrous oxides in the metal so as to prevent corrosion and extend the life of the metal. Since both lead and tin are relatively stable elements, the lead and tin oxidize very slowly even in harsh environments. As a result, the terne alloy is an excellent protective coating that requires little, if any, maintenance and significantly inhibits the oxidation of ferrous compounds in the metal. Because of the excellent anti-corrosion qualities of terne coated metals, ferrous metal coated with a terne alloy are commonly used in metal roofing, metal siding and other industrial applications where unprotected metals would exhibit high corrosion rates.

Although terne coated metals have excellent corrosive resistive properties, the terne coating when initially applied has several adverse properties when used in certain applications. Terne coated metals are commonly used as roofing materials in both civilian and military airports. Metals that are newly coated with a terne alloy have been found to have a high reflectivity of both visual light and electromagnetic waves such as used in radio transmissions. This high reflective property of newly coated terne when used for building materials in airports, especially roofing materials, adversely effects the radar and communication in the surrounding area. Furthermore, glare of the sun caused by the relatively high reflectivity of the terne coating can cause temporary visual impairment when the pilot is taking off or landing at the airport.

The high reflective properties of metals that have been newly coated with a terne alloy continues until the terne coating begins to oxidize. The oxidation of terne coating is commonly known as weathering. As the terne alloy begins to weather, a layer of lead oxide and tin oxide forms on the terne coating. The lead and tin oxide layer is known also as a patina formation. Consequently, weathering of the terne coating is essentially the corrosion of the terne alloy. Since lead and tin are relatively inert, the complete corrosion of the terne coating takes a very long time. The life of the terne coating is further extended by the formation of the lead oxide and tin oxide on the terne alloy. The lead and tin oxides essentially act in of itself as a protective barrier to the terne coating. The lead and tin oxide layer significantly reduces the amount of oxygen or moisture that comes in contact with the non-oxide terne coating by acting as a stable barrier against the adverse elements. The oxided layer of lead and tin further increase the time necessary to adequately weather the terne. Due to the stability of lead and tin, terne coating which is exposed to the atmosphere normally takes approximately ten years before the alloy is considered to be completely weathered, a condition which is highly desirable for roofing and other building applications.

The lead and tin oxide formation or patina formation on the terne coating exhibits a duller appearance than newly terne coated metals. The patina formation on the terne alloy is significantly less reflective to both visible light and electromagnetic waves. Consequently, weathered terne is preferable to newly coated terne for building and roofing materials, especially used in airports and military facilities. Since the patina formation on terne takes about ten years to form to a point whereby the terne coating is not unduly reflective to visible light and electromagnetic waves, many industries have either refused to use terne coated materials or have attempted to artificially reduce the terne's reflective properties. Storing the terne coated steel for about ten years is infeasible due to the cost, time and space requirements.

One common method to overcome the adverse effects of high reflectivity of the terne coating has been to treat the terne coating with a less reflective substance. Normally paints are used containing dull, non-reflective pigments. However, the use of paint to disguise the reflective nature of the terne is normally an unsatisfactory and expensive solution. Paints are normally designed to be a protective layer to the material it is applied to. Paints such as those disclosed in Miller and Troutman normally contain some type of corrosion inhibiting ingredients to prevent oxidation of the metals the paint is applied to. When such a paint is used on terne coating, oxygen and moisture are sealed off from the terne surface. As a result, the terne coating never has a chance to oxidize. Consequently, when the paint begins to deteriorate and peel away, the non-oxidized high reflective terne coating is again revealed. As a result, the paint surface must continuously be maintained to prevent the adverse reflective effects of the non-oxidized terne coating. The time, effect and expense to maintaining the paint on the terne coating reduces the desire to use terne coated metals. As a result of the inadequate and expensive remedies to reduce the reflectivity of non-oxidized terne metal, there has been a demand for a method to accelerate the weathering of terne coated metals.

THE INVENTION

The present invention relates to the treating of a terne coated metal with an asphalt based paint to cause accelerated weathering of the terne plate when exposed to the atmosphere.

In accordance with the principal features of the present invention, there is provided a metal having a terne coating wherein a special asphalt based paint is applied to the terne coating at such a drastically reduced thickness to produce a semi-transparent or translucent coating over the terne coating. The painted terne coated metal is then exposed to the natural elements of rain, wind and sunlight. After abut six months of being exposed to the natural elements, the terne coating exhibits weathering that normally takes about ten years. The asphalt based paint contains a suspension of free carbon that apparently acts as a catalyst to the weathering process. The paint can remain on the tern coated steel after weathering or can be removed. The preweathered terne coat product can be safely used in areas that require non-reflective substances for building materials with essentially full weathering in about 4-6 months.

The specially formulated asphalt based paint that is applied to the terne surface is a petroleum based paint comprised of asphalt, titanium dioxide, inert silicates and low clay, carbon black or other free carbon and an anti-settling agent. The paint is applied at such drastically reduced thickness that a semi-transparent or translucent layer is formed over the terne surface. The thickness of the paint is so thin that the spangled pattern of the terne coating is advisable. This thickness is less than 1.0 mil and preferably in the range of 0.5-1.0 mil. The asphalt is thinned to allow such a thin film of paint on the terne coated sheet. Paint coatings that have thickness that conceal the underlying terne coating are too thick and will impair the accelerated preweathering of the terne metal. The paint is of a dull, lackluster color which has low reflective properties. The paint is therefore designed to affect the accelerate of the patina formation on the terne coating and simultaneously reduce the reflective properties of the newly coated terne during the time it is causing the sheet to weather.

In accordance with another feature of the present invention, the rheology of the paint is controlled whereby the paint can be easily applied at the desired thickness. Inert silicates or clays are normally added to paints as inert filler materials and to improve the flow characteristics of the paint. In practice, naphthalene which is a solvent for the asphalt is added to provide a paint which can be applied to the terne coating as a thin, translucent film having a thickness of less than 1.0 mil. Petroleum solvents such as paint thinners are also used to modify the fluidity of the paint. The inert silicates, clays and solvents are used in concert to allow proper paint application thickness to achieve a semi-transparent layer or translucent film over the terne. The content of the silicates, clays and/or thinners should be adjusted so as to allow the paint to be applied by conventional paint sprayers or by squeegee rollers at a desired thickness.

In accordance with yet another feature of the present invention, the grade and weight percentage of titanium dioxide and weight percentage of carbon black, lamp black or other added free carbon are varied such that the period of time before the paint begins to deteriorate is controlled. The source of titanium oxide commonly exists in two grades, an anatase grade and a rutile grade. When the titanium oxide exists in an anatase grade, the life of the paint coating is reduced. Asphalt is highly resistant to water but not to light. Asphalts containing large amounts of free carbon and naphthalene as anticipated by the present invention are highly sensitive to light, especially ultraviolet light for a short period of time. As a result, asphalts exhibit black chalking and/or fissuring when exposed to light. The anatase grade titanium further accelerates the chalking and fissuring of asphalt in the presence of light. The use of a rutile grade titanium dioxide has a diametric effect from anatase grade titanium dioxide on the chalking and fissuring of light exposed asphalt. The rutile grade titanium dioxide stabilizes the asphalt and reduces the chalking and fissuring effects caused by light exposure. Therefore, by regulating the ratio of anatase grade to rutile grade titanium dioxide, the rate at which the asphalt base paint deteriorates can be controlled to maintain the thin translucent film for the 3-6 months needed for the catalytic effect of the free carbon in combination with moisture that penetrates the permeable film to accelerate the weathering of terne coating. The amount of carbon-black in the paint will also affect the life of the paint. Carbonblack is a dark pigment that through its interaction with ultraviolet light will cause an increased chalking and fissuring of the asphalt in the paint. As a result, an increased amount of carbonblack contained in the asphalt based paint will significantly increase the deterioration rate of the paint. As a result, the particular amount and form of titanium dioxide in conjunction with the amount of carbonblack can be varied to control the deterioration rate of a particular asphalt based paint.

By using the present invention, the thin film colors the terne coated steel and causes the terne coating to oxidize rapidly. Thereafter, the film deteriorates leaving a fully weathered exposed surface in about six months. In the past, a paint was sometimes suggested and tested to cover the shiny, reflective terne coating; however, such paint inhibited natural corrosion of the terne. When the paint gradually flaked or peeled off, the shiny surface was exposed. Thus, use of a paint to reduce reflectivity was not a permanent solution. By the present invention, the paint is applied merely as a sheen which allows normal weathering which having catalytic action to accelerate this natural action. The fully weathered roof is then non-reflective for the rest of its life, which is anticipated to be decades.

In accordance with the invention, there is provided a method of treating a terne coated steel strip for acceleration of the oxidation of the terne coating from over several years to substantially less than one year, i.e. between 4-6 months, which method comprises the steps of providing a paint containing free carbon in a thinned asphalt suspension and applying this paint suspension onto the terne coating of the steel strip with a thickness less than about 1.0 mil to produce dull translucent sheen or film on the terne coating.

In accordance with another aspect of the invention, the asphalt based paint is provided with agents to cause deterioration of the dull translucent sheen or film in a short period, i.e. after the terne has been weathered.

The primary object of the present invention is the provision of a method of treating terne steel sheet material to cause accelerated weathering of the terne coating on the sheet material.

Another object of the present invention is the provision of a terne steel sheet material coated with a thin, translucent film of containing free carbon suspended in an asphalt based paint, which film causes the terne layer of the sheet steel material to weather rapidly, such as weathering in less than about six months.

Yet another object of the present invention is a thin film, as defined above, which film maintains a dull color until weathering of the terne coating and then deteriorates after the accelerated weathering of the terne coating.

Another object of the invention is the provision of a terne coated sheet material having a dull, thin translucent sheen or film as resulting from implementation of the inventive method of the invention.

Another object of the present invention is the provision of a terne coated steel strip with a thin translucent film permeable to moisture and ultraviolet rays and containing a suspension of free carbon and an agent causing the film to deteriorate after about four to six months exposure to sunlight.

These and others objects and advantages will become apparent from the following description taken together with the accompanying drawing.

PREFERRED EMBODIMENT

Figure 1:
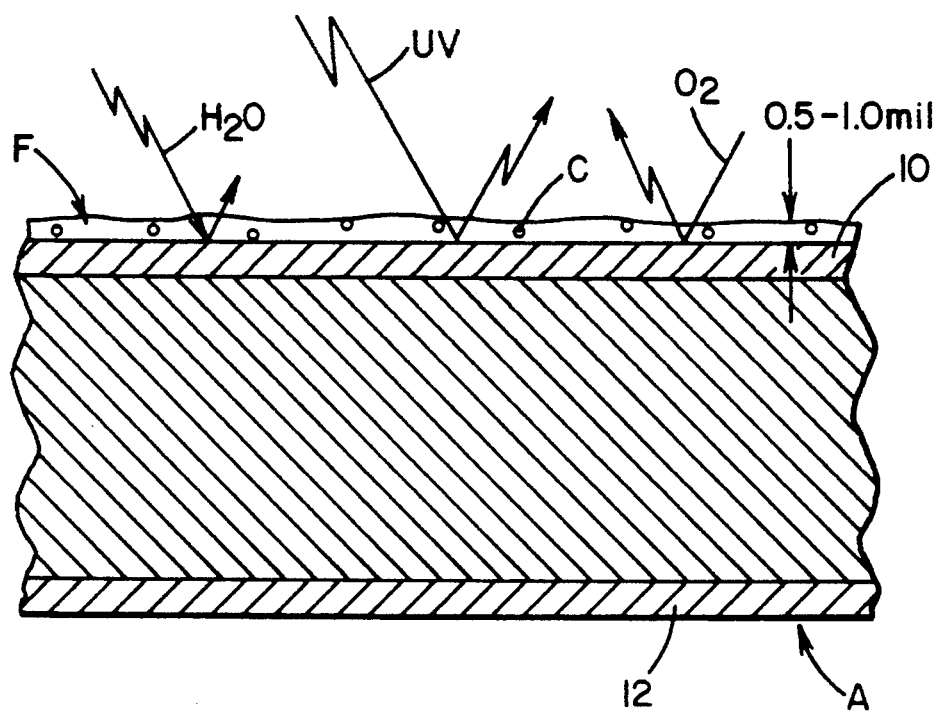
FIG. 1 is an enlarged cross-sectional view of a terne coated metal with a layer or coating of paint illustrating schematically moisture, oxygen and the sun's radiation penetrating the asphalt based paint layer of the present invention; and, FIG. 2 is a schematic side view illustrating the preferred embodiment of the process for applying the film of the present invention.
Figure 2:
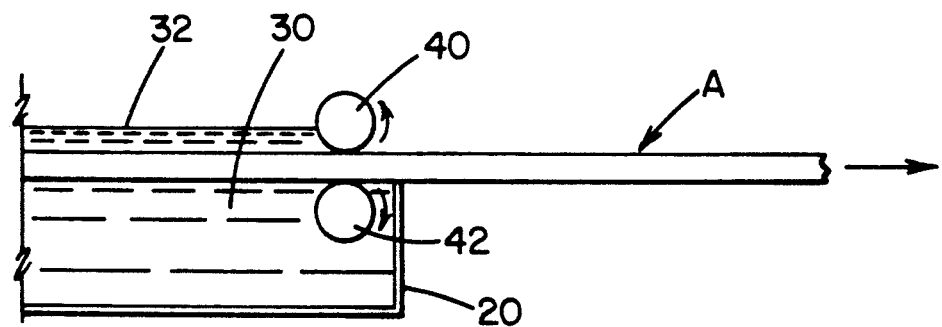

The treated terne coated metal of this invention exhibiting accelerated preweathering of the terne surface includes the application of a specially formulated asphalt based paint having certain maximum coating thickness and subsequently exposing the painted terne coated metal to the natural elements of the atmosphere. The invention involves the use of a paint that both catalyzes the oxidation of lead and tin in the terne coating and simultaneously acting as a non-reflective coating until the terne coating is oxidized, i.e. weathered.

The paint developed for the dual purpose of reducing reflectivity of light and electromagnetic waves and simultaneously accelerating the patina formation of the terne coating is a specially formulated asphalt based paint in combination with several other ingredients. The primary ingredient of the paint is an asphalt. An asphalt is a bituminous substance which may be of natural occurrence or a residue in petroleum distillation. Gilsonite, a naturally occurring asphalt mined in Utah, is one of many asphalts that may be used in the paint and is the asphalt preferably used in the invention. The asphalt accounts for over 60% of the composition of the paint and is the vehicle or binding medium of the paint on the terne coating. Asphalts are often combined with petroleum solvents to produce lacquer type films. These films are applied thick enough to protect the surface from moisture penetration. If naturally occurring asphalts are used, the composition of the asphalt will vary and may contain up to about 0.5% sulfur. Asphalts generally have a very high resistance to water thus being commonly used as water sealers. However, asphalts generally have poor adhesion to metal, thus normally requiring additional binding elements when applied to metals. Asphalts also have a low resistivity to ultraviolet radiation. Asphalts commonly contain free carbon and naphthalene or naphthalene derivatives. Both free carbon and naphthalene have a tendency to react and/or breakdown when exposed to light. These two compounds are especially sensitive to ultraviolet light. When the naphthalene or free carbon reacts with the light, chalking or fissuring in the asphalt occurs. Chalking is commonly known as the disintegration of a painted surface by the paint transforming into a power substance. Fissuring of the asphalt is commonly known as the fracturing or cracking of the asphalt. Both fissuring and chalking in the asphalt significantly increases the deterioration rate of the asphalt based paint. The natural life of the paint will thus vary depending on whether a particular asphalt being used contains high concentrations of free carbon and/or naphthalene. The invention uses a film which deteriorates after the terne coating is weathered. The film contains free carbon and is permeable so that moisture penetrates and coacts with the free carbon and ultraviolet rays to oxidize the terne rapidly. The asphalt makeup of the paint of the invention is between 60% to 80% by weight of the paint. In the preferred embodiment, gilsonite is used and the weight percent in the paint is between 64% to 78%, and preferably about 68%, by weight.

The paint used in practicing the invention contains two coloring pigments in the form of titanium dioxide and carbonblack. The relative value or ration of these elements modifies the color of the film used to accelerate oxidation of the terne. The titanium dioxide is naturally occurring in two grade types, an anatase grade and a rutile grade. In addition to using the titanium dioxide as a pigment for the paint, the titanium dioxide is used to modify the properties of the asphalt in the paint to control the natural deterioration of the paint. The invention uses the paint in a thin film which is to disappear after the weathering or oxidation of the terne caused by the film changes the color of the terne. The two natural grades of titanium dioxide have diametric effects on asphalt deterioration. Thus, they are combined to give a desire deterioration rate. The anatase grade, when exposed to radiation, especially ultraviolet light, reacts in the presence of the asphalt. The reaction causes the asphalt to destabilize which in turn results in chalking and fissuring in the asphalt. Contrary to the anatase grade, the rutile grade of titanium dioxide combines with and stabilizes the asphalt. As a result, the natural life of the asphalt film on the terne is extended when combined with a rutile grade titanium dioxide. By selecting the proper ratio of anatase grade titanium to rutile grade titanium, the deterioration rate of the asphalt base paint can be controlled. The amount of titanium oxide in the paint is between 1.0 to 25.0 weight percent, and preferably being about 19.0 weight percent. In the preferred embodiment, over 50 percent of the titanium oxide is anatase grade.

The second pigment used in the paint is carbonblack or lampblack. Carbonblack or lampblack is a name given to finely divided carbon produced from burning hydrocarbons. Carbonblack is normally added to paints as a dark black pigment. The addition of carbonblack to asphalt paints also affects the deterioration of asphalt. Carbonblack becomes active when exposed to light, especially ultraviolet light. As the carbonblack is activated, the asphalt within the paint begins to fissure and chalk at an accelerated rate. The addition of carbonblack to the paint increases the free carbon content of the asphalt. It is known that the higher the free carbon content of an asphalt, the faster the asphalt chalks and/or fissures in the presence of light. Therefore, higher the free carbon content of the originally contained asphalt, the less carbonblack that can be added to the paint. Typically, carbonblack constitutes no more than 2.0% by weight of the paint. If the asphalt in the form of gilsonite is used, the amount of carbonblack that is added to the paint varies between 0.5 to 1.0 weight percent and is preferably 0.7 weight percent. The free carbon of the asphalt and the added free carbon of the carbonblack coacts with the moisture that penetrates the thin film on the terne and the ultraviolet rays to be a catalyst to the oxidation process. Thus, the invention is a suspension of the free carbon in a thin permeable film which will ultimately disappear from the weathered terne coated strip.

The paint also contains an inert silicate or clay material. Normally these types of materials are used to improve rheology or flow characteristics of the paint. Calcium borosilicate is preferably used in the paint in amounts typically between 8.0% to 11.0% weight. Surprisingly, calcium borosilicate is a known corrosion inhibitor commonly used in many paints. Since the purpose of the thin film of paint is to assist in accelerating the oxidation of tin and lead, the success of using calcium borosilicate in a corrosion accelerating paint is highly unanticipated.

An antisettling agent or suspending agent is also added to the paint to prevent the paint solids from agglomerating after application to the terne plate. The antisettling agents used in the paint are normally organophillic clays. The amount of antisettling agent should be between 0.4 to 0.7 weight percent and preferably being about 0.5 weight percent.

The thickness of the thin film of paint when applied to the terne plate is very important to achieving the desired accelerated oxidation, i.e. preweathering, of the terne alloy. The exact interaction between the paint and the terne coating is unclear. However, it is believed that the asphalt based paint does not directly react with the terne plate, but instead acts as a catalyst. Since carbon is a very noble metal, the accelerated patina formation in the pressure of oxygen and moisture may be caused by a galvanic action between the carbon and terne coating. Whatever interaction actually exists between the paint and terne coating, it is know that the catalytic effects of the thin film of paint are directly associated with the thickness of the film. The paint must be of such thickness as to allow the sun's radiation to penetrate the film. In addition, it is believed that the film thickness must be thick enough to trap oxygen and moisture between the paint and the terne coating, but thin enough to allow additional oxygen and moisture to penetrate the film at a time when the initial trapped oxygen and moisture is used up in the lead and tin oxidation reaction. The film must be applied with a maximum thickness. Up until just recently, it was not known that the thickness of the film was a controlling and, indeed, critical aspect of the preweathering system. Thus, the paint is thinned and applied to give a translucent film. This concept was considered to be a breakthrough.

The lead and tin need a source of oxygen and a source of energy to create lead and tin oxide. The most likely source of oxygen is the amount that is trapped between the paint and terne coating. In addition, any moisture that is trapped between the terne plate and paint film can be a source of oxygen. The energy source is most likely the radiation from the sun. Ultraviolet light is the likely type of radiation that energizes the oxidation reaction because of its ability to penetrate asphalt substances. However, other forms of radiation may play an essential or complementary role in the catalyzation of the tin and lead. In addition to being a probable energy source, ultraviolet radiation is known to cause several reactions within the paint forming the thin film. The decomposition of the asphalt caused by the reactions within the film may create new or intermediate compounds which may facilitate the catalyzation of the lead and tin oxides.

Whatever catalytic mechanism that occurs between the asphalt based paint of the thin film and the terne coating, the thickness of the film on the terne must be such that a semi-transparent or translucent film is formed. A coat of the asphalt based paint that completely hides the terne coating will not properly preweather the terne coating. Although the significance of the paint thickness is realized, the reason for the translucent thickness as it pertains to the patina formation on the terne coating is not completely understood. It is believed that the thicker that paint is, the less amount of radiation, especially ultraviolet radiation, penetrates through the film to assist in energizing the oxidation of the lead and tin. It is known that free carbon, naphthalene and titanium dioxide react in the presence of ultraviolet light. As the thickness of the paint film increases, ultraviolet radiation is more likely to be absorbed by one of the carbon or titanium compounds in the paint. Furthermore, if visible radiation is a part of the catalytic reaction, a film thickness that hides the terne coating will significantly impair the ability of the visible light to penetrate the asphalt paint layer.

A too thick layer of the asphalt based paint may also impair any additional source of oxygen. Initially, it is believed that the source of oxygen for the lead and tin oxide reaction originates from oxygen and moisture trapped between the paint and terne metal. Additional oxygen sources may also result from oxygen or moisture within the paint film that have migrated to the terne coated surface. However, the amount of oxygen and moisture trapped between the paint and terne coating and within the paint film itself is believed to be insufficient to achieve the desired amount of weathering of the terne coating. When thinner paint films are used, it is more likely that an imperfect covering of the terne coating exists. In addition, any amount of chalking or fissuring of the asphalt will allow oxygen and moisture to penetrate a thin paint coating. Therefore, by maintaining an ultra thin asphalt paint film, oxygen and moisture can penetrate the paint film and feed the catalyzed lead and tin oxide reactions. The desired film thickness is a thickness that is semi-transparent or translucent once the paint dries. The film merely adds a brownish grey sheen to the terne coating on the steel sheet. The titanium dioxide and carbonblack are both common pigments with excellent covering power. Due to the covering power of the paint, an extremely thin paint film must be applied to obtain a sheen or translucent film. However, the film must have a thickness that present the necessary constituents for the accelerated oxidation or weathering. A paint film which is too thin will not adequately accelerate the patina formation on the terne. It has been found that the special asphalt based paint applied with a thickness between 0.5 to 1.0 mil results in accelerated weathering of the terne coating. The film thickness allows sufficient radiation to penetrate the film covering, supplies adequate catalytic sites for the lead and tin oxide reaction, and permits the possible penetration of additional oxygen and moisture. Furthermore, the minimum preferred film thickness satisfactorily reduces the reflectivity of the terne during the time period necessary to effect a desirable preweathered terne coated steel products.

Referring now to the drawings, FIGURE shows a terne coated steel strip A with outer coating 10, 12 of terne alloy. In accordance with the present invention, an ultrathin film F is applied over one or both coatings 10, 12. The film is formed from a thinned asphalt based paint containing free carbon, shown schematically as particles C. The particles originate from the asphalt and are supplemented by adding carbonblack to the paint which forms film F. The film is thin and impervious to water and oxygen. Further, the film is applied in a thin layer of less than 1.0 mil and in the range of 0.5-1.0 mil so that the ultraviolet rays of the sun can penetrate the film and coact with the film constituents to cause weathering of the coatings 10, 12 at an accelerated rate. The film has a short life which is sufficient to allow the film to cause weathering. Thus, the film contains coloring for the terne coated strip and remains as the primary exterior color until the coatings 10, 12 are colored by oxidation, i.e. weathering. Then the film gradually deteriorates and disappears. To apply the thin film strip A is moved through tank or tray 20 containing a thin paint solution 30 to a level 32. Squeegee rolls 40, 42 apply an ultrathin film of the paint solution 30 to both sides of strip A. The strip is then stored without exposure of the film to the sun. When needed, strip A with film F on both sides is formed into roofing panels and applied as a roofing system for a building. When exposed to weather conditions, the film is activated to cause accelerated weathering of the particular coating 10, 12 facing outwardly from the roof. Within about 4-6 months, the exposed coating 10, 12 is fully weathered and then the built-in deteriorating system of the exposed film F causes the film to gradually disappear. Thus, the coloring of the film gives a dull finish to strip A until the strip is weathered. In the past, the strip was highly reflective for a number of years until the strip was fully weathered.

Viscosity control agents are added to the asphalt based paint 30 to obtain a paint film F with a thickness between 0.05 to 1.0 mil. Paint fillers such as clays and inert silicates are commonly added to improve the rheology of the paint. A paint with a high viscosity can not be applied at the proper ultrathin thickness to form the required semi-transparent film F. A petroleum solvent is added to reduce the viscosity of asphalt based paint. The addition of clays and inert silicate further improves the flow characteristics of the paint. Inert silicates, such as calcium borosilicate, and clays in the amount between 8.0 to 15 weight percent, in conjunction with petroleum solvents, effectively control the rheology of the paint and allow the asphalt based paint to be satisfactorily applied at the required ultrathin thicknesses.

The catalytic reaction for accelerating the tin and lead oxidation reaction takes about six months before a satisfactory patina forms on the exposed terne coating. The six month period is significantly shorter than the normal ten year period necessary to fully weather terne coating.

Since terne coated metals coated with the asphalt based film F take approximately six months before a satisfactory patina formation occurs, the composition of the film must be such that the film on the terne coating will not completely deteriorate before expiration of the required six month catalytic oxidation period. However, some film deterioration during the six month period is necessary to allow additional oxygen and perhaps moisture to penetrate the film and feed the catalyzed lead and tin oxidation reaction. The deterioration of the paint forming film F when exposed to normal atmospheric condition, is dependent on the type of asphalt used, the amount of carbonblack added to the paint, and the type and amount of titanium dioxide added to the paint. Asphalt with high concentrations of free carbon and/or naphthalenes exhibit increased rates of chalking and fissuring when exposed to the ultraviolet rays of the sun. Carbonblack, when added to asphalt, acts as a free carbonblack, when added to asphalt, acts as a free carbon source that increases chalking and fissuring in the asphalt. Titanium oxide, when in the anatase grade form, destabilizes asphalts and increases the rate of chalking and fissuring. Titanium oxide in the rutile grade form stabilizes asphalts and reduces the chalking and fissuring in the asphalt. Based on the type of atmospheric conditions the painted terne coated material will normally be exposed to, the life of the film can be controlled by varying the type of asphalt, the amount of carbonblack, and the amount of titanium dioxide added to the paint. It has been found that an asphalt based paint containing the asphalt gilsonite of 64 to 78 weight percent, titanium oxide of 1.68 to 20.5 weight percent, inert silicates and clay of 8.4 to 10.3 weight percent, carbonblack of 0.63 to 0.77 weight percent, and an anti-settling agent of 0.4 to 0.52 weight percent exhibits excellent accelerated weathering characteristics when applied as a semi-transparent layer on terne coating and having a desired deterioration rate over the necessary preweathering period.

The thin film F is possible by adding a solvent to paint as defined above. Thus, the paint includes an asphalt base, a solvent allowing the paint to be applied as a sheen or ultra thin translucent film, a coloring agent to give a color to the strip before the strip weathers fully and a system to cause the film to deteriorate ones time. The free carbon in suspension is the basic catalyst. The film has a brownish-grey color and is pervious to moisture, oxygen and ultraviolet rays. The thickness of the film is in the range of 0.5 to 1.0 mil and the strip A has a thickness of 0.016 inches The film is thin enough that the normal spangle of the terne is fully visible through the film, thus the film is translucent.

Having thus described the invention, it is claimed:

1. A coated steel sheet member that exhibits high resistance to corrosion and having accelerated terne patina formation when exposed to the atmosphere to produce a dull, iron oxide corrosion resisting finish, said sheet member including an outer layer of an alloy of lead and tin to produce a terne coated metal coated with a translucent layer of an asphalt base paint having a thickness of not more than 1.0 mil which accelerates said patina formation, said asphalt base paint comprises the following weight percentages: asphalt 60–80%, titanium oxide (anatase and rutile) 1.0–25.0%, inert silicates or clay 8.0–11.0%, carbon black 0.5–2.0% and antisettling agent 0.4–0.7%.

2. A coated steel sheet member as in claim 1, wherein said asphalt is gilsonite with a weight percentage between 64 to 78%.

3. A coated steel sheet member as in claim 1, wherein titanium oxide is a rutile grade.

4. A coated steel sheet member as in claim 1, wherein titanium oxide is an anatase grade.

5. A coated steel member as in claim 1, wherein said inert silicate is borosilicate.

6. A coated steel sheet member as defined claim 1, wherein the thin film translucent coating contains a naphthalene based solvent prior to being dried.

7. A coated steel member as in claim 1, wherein said paint coating thickness is approximately 0.5 to 1.0 mil.

8. A terne coated metal as in claim 1, wherein said paint layer has a thickness is of 0.5 to 1.0 mil.

9. A coated steel member as in claim 2, wherein said paint coating thickness is approximately 0.5 to 1.0 mil.

10. A coated steel member as in claim 6, wherein said paint coating thickness is approximately 0.5 to 1.0 mil.

11. A terne coated steel strip having a thin translucent film of less than 1.0 mil in thickness and permeable to both moisture and ultraviolet rays and containing a suspension of free carbon particles and a system causing said film to deteriorate after four to six months of exposure to sunlight, said suspension comprising: asphalt 60–80%, titanium oxide (anatase and rutile) 1.0–25.0%, inert silicates or clay 8.0–11.0%, carbon black 0.5–2.0% and antisettling agent 0.4–0.7%.

12. A terne coated strip as defined in claim 11 wherein said film contains a coloring agent.

13. A terne coated metal having accelerated patina formation of the tin and lead alloy, said metal being coated with a translucent layer of paint of a thickness of not more than 1.0 mil which accelerates said patina formatoin and comprises 0.7% carbon black, 18.65% titanium oxide, 9.32% calcium borosilicate, 70.86% gilsonite and 0.47% antisettling agent.

* * * * *